(12) United States Patent
Vehra

(10) Patent No.: US 12,037,876 B2
(45) Date of Patent: Jul. 16, 2024

(54) DOWNHOLE POWER MANAGEMENT SYSTEM WITH RECHARGEABLE BATTERIES AND GENERATORS

(71) Applicant: Halliburton Energy Services, Inc., Houston, TX (US)

(72) Inventor: Imran Sharif Vehra, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/960,227

(22) Filed: Oct. 5, 2022

(65) Prior Publication Data

US 2024/0117715 A1   Apr. 11, 2024

(51) Int. Cl.
*E21B 41/00* (2006.01)
*H02J 7/00* (2006.01)
*E21B 47/06* (2012.01)

(52) U.S. Cl.
CPC ........ *E21B 41/0085* (2013.01); *H02J 7/0013* (2013.01); *H02J 7/0047* (2013.01); *E21B 47/06* (2013.01)

(58) Field of Classification Search
CPC ...... E21B 41/0085; E21B 21/08; E21B 47/06; H02J 7/0013; H02J 7/0047
See application file for complete search history.

(56) References Cited

U.S. PATENT DOCUMENTS

| | | | |
|---|---|---|---|
| 4,314,008 A | 2/1982 | Blake | |
| 8,975,861 B2 | 3/2015 | Teodorescu et al. | |
| 10,907,427 B2 | 2/2021 | Bellicard et al. | |
| 2003/0048697 A1 | 3/2003 | Hirsch et al. | |
| 2005/0139393 A1* | 6/2005 | Maurer | E21B 41/0085 175/57 |
| 2012/0228875 A1* | 9/2012 | Hardin, Jr. | F03B 13/00 290/52 |

(Continued)

FOREIGN PATENT DOCUMENTS

| | | |
|---|---|---|
| CN | 104271880 A | 1/2015 |
| EP | 2820237 B1 | 1/2019 |

(Continued)

*Primary Examiner* — Brad Harcourt
(74) *Attorney, Agent, or Firm* — Benjamin Ford; Parker Justiss, P.C.

(57) ABSTRACT

The disclosure provides a downhole power system that includes a combination of different power sources, which includes downhole power generators and rechargeable batteries that can be recharged downhole, a downhole bus and a bus power controller that manages the distribution of power from the different power sources to downhole tools connected to the downhole bus, such as tools of a BHA. The different power sources can be strategically positioned along the downhole bus/BHA. An example of a downhole distributed power system includes: (1) a downhole bus, (2) different power sources connected to and strategically positioned on the downhole bus, and (3) one or more controllers to perform operations that includes managing distribution of power, from the different power sources, to downhole tools connected to the downhole bus, wherein the different power sources include one or more power generators and one or more rechargeable batteries that are chargeable downhole.

22 Claims, 8 Drawing Sheets

(56) References Cited

U.S. PATENT DOCUMENTS

| | | | |
|---|---|---|---|
| 2014/0311804 A1 | 10/2014 | Gadot et al. | |
| 2016/0003007 A1 | 1/2016 | Liu et al. | |
| 2016/0237790 A1* | 8/2016 | Williams | E21B 47/18 |
| 2016/0241053 A1 | 8/2016 | Erdos et al. | |
| 2018/0163514 A1* | 6/2018 | Guven | E21B 21/12 |
| 2018/0347319 A1* | 12/2018 | Feluch | E21B 47/14 |
| 2018/0347348 A1* | 12/2018 | Jaaskelainen | E21B 47/14 |
| 2022/0081982 A1 | 3/2022 | Blois et al. | |
| 2022/0356803 A1* | 11/2022 | Guelat | E21B 47/13 |

FOREIGN PATENT DOCUMENTS

| | | |
|---|---|---|
| GB | 2563443 A | 12/2018 |
| WO | 2016153998 A1 | 6/2016 |
| WO | 2016153981 A1 | 9/2016 |
| WO | 2017087855 A1 | 5/2017 |

* cited by examiner

DOWNHOLE POWER MANAGEMENT SYSTEM WITH RECHARGEABLE BATTERIES AND GENERATORS

BACKGROUND

Various types of tools are used in the oil and gas industry for downhole operations, such as drilling a borehole. The different types of downhole tools require power to perform their particular task. Non-rechargeable batteries are often used as source of power for the downhole tools. For example, lithium thionyl chloride batteries are commonly used to provide power for downhole, high-temperature applications. In addition to non-rechargeable batteries, downhole generators are also used to provide power for downhole operations.

BRIEF DESCRIPTION

Reference is now made to the following descriptions taken in conjunction with the accompanying drawings, in which.

DETAILED DESCRIPTION

Figure 1:
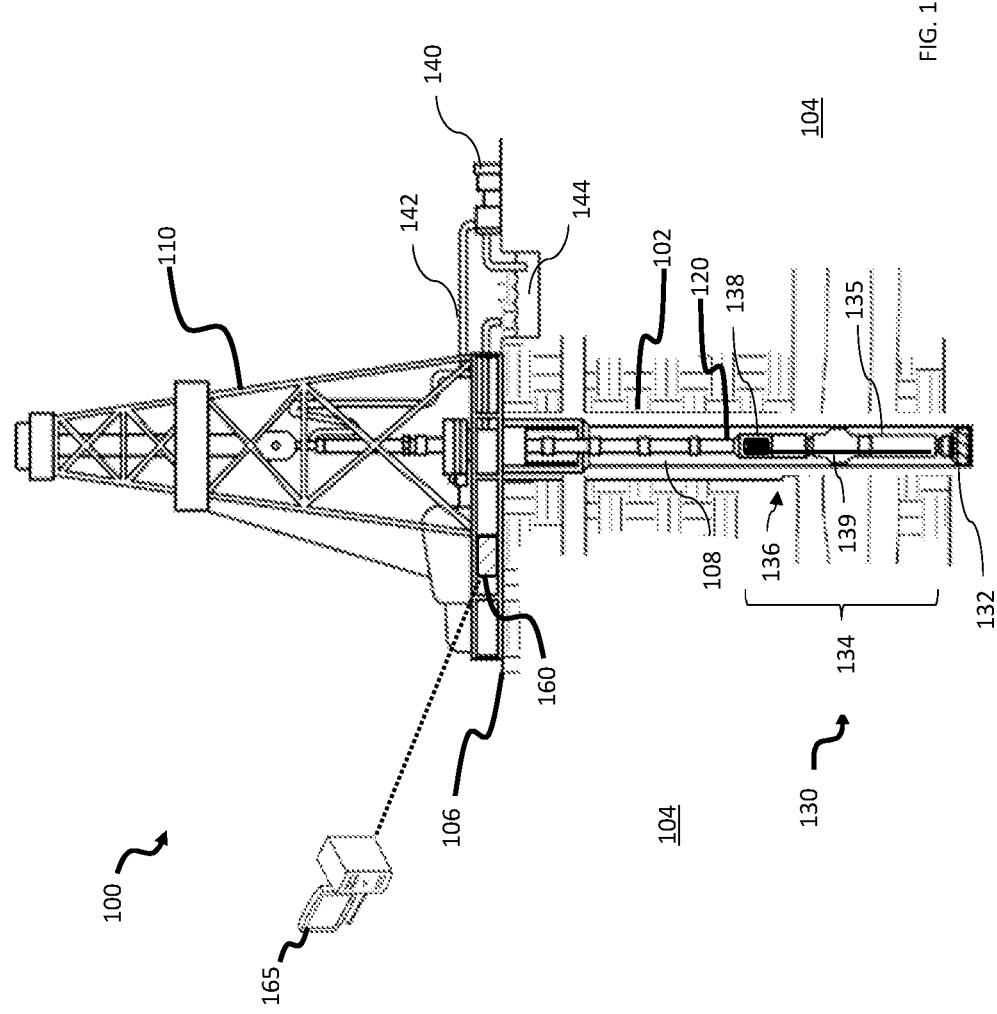
FIG. 1 illustrates a system diagram of an example drilling system constructed according to the principles of the disclosure.

For downhole operations, energy calculations are performed to insure there will be a sufficient amount of power available for the duration of an operation. As such a significant amount of non-rechargeable batteries are typically deployed for downhole operations. The amount of volume needed to house the non-rechargeable batteries can also be significant and limit the availability of space proximate to the downhole tools, such as drill bits, for the placement of sensors.

Additionally, non-rechargeable batteries eventually deplete and have to be replaced. Replacing such batteries during a downhole operation may require a trip-out, which is extremely expensive and time consuming. Even though downhole generators typically do not have to be replaced, some downhole generators only generate power when the drilling mud is being pumped. Accordingly, an improved system for providing downhole power would be beneficial in the oil and gas industry.

The disclosure provides a downhole power system that includes a combination of different power sources, which includes downhole power generators and rechargeable batteries that can be recharged downhole. Using the rechargeable batteries advantageously reduces the amount of space (e.g., length) needed in a BHA for power sources since the rechargeable batteries can be recharged downhole. With less length of a BHA dedicated to batteries, sensors can be positioned closer to downhole tools, such as drill bits. Additionally, using rechargeable batteries which can be recharged in situ reduces the amount of service time needed to replace non-rechargeable batteries when depleted or after a downhole operation. By reducing the number of times needed for replacing batteries, the amount of exposure of the tools to the environment, such as moisture and dirt, can be reduced. As such, the life of the tools can be increased. The disclosed downhole power system, therefore, can improve the efficiency of a downhole operation, such as a drilling operation, and increase the reliability of downhole tools.

In addition to power sources, the downhole power system also includes a downhole bus and a bus power controller that manages the distribution of power from the different power sources to downhole tools connected to the downhole bus, such as tools of a BHA. The different power sources include stand-alone power sources that are connected to the downhole bus and are not dedicated to a particular downhole tool. The different power sources also include integrated power sources that are integrated with a particular one of the downhole tools for providing power for that particular tool. The downhole power system can be a distributed downhole power system wherein the different power sources, regardless whether a stand-alone or an integrated power source, can be strategically positioned along the downhole bus/ BHA. Strategically positioning of the different power sources can be based on one or more factors, such as, reducing voltage drop on the downhole bus, interspersing the different type of power sources on the downhole bus, and paring particular power sources with particular downhole tools.

As noted above, the downhole power system includes rechargeable batteries that can be recharged downhole. The rechargeable batteries can be charged via different types of downhole power generators that produce power for the recharging. For example, the downhole power generators can produce power when the drilling mud is flowing in the borehole. RPM generators based on rotations of, for example, the BHA, and piezoelectric generators are examples of other types of power generators that can be used. A combination of more than one type of a downhole power generator can be used for recharging. The rechargeable batteries can also be charged over different amount of times, such as a rapid charge or a slow charge. For slow charges, the rechargeable batteries may harvest energy from the power bus, such as similar to a trickle charge.

The voltage produced by the downhole power generators can be kept at a higher setting than the battery voltage from the rechargeable batteries of the downhole power system. This has a two-fold advantage. First, detecting if power available on the downhole bus is from a downhole power generator or from a rechargeable battery can be simply determined by measuring the bus voltage level. Measuring the bus voltage level can be used in addition to other means described herein for detecting power generation by a downhole power generator. Second, keeping the generator voltage higher than the battery voltages insures that the consumers of power or loads pull power from the generators first and then the batteries by using, for example, simple diode configurations or schemes. The rechargeable batteries can be connected to the downhole bus via a bidirectional connection that allows providing power to the bus and receiving power from the bus for charging. Some of the different power sources, such as integrated power sources, may be coupled to the downhole bus via a power converter.

Managing the power distribution includes controlling charging of the rechargeable batteries using, for example, one or more of the downhole power generators. Managing the power distribution can also include the capability to detect failure of a power source and disconnect a failed power source from the power bus. The failed power source can be isolated from the power portion of the downhole bus but still be communicatively coupled to the downhole bus for communications. By maintaining communication, a tool associated with the failed power source can be connected to the power bus and receive power to operate. The emergency power from the power bus may be sufficient for a lower mode of operation of the tool. For example, the failed power source can be an integrated power source for a resistivity tool that provides power for the resistivity tool to operate in a normal operating mode. Without power from the integrated power source, the resistivity tool may operate with emergency power from the power bus that is sufficient for a lower operating mode of the resistivity tool but does not provide the penetrating power into a subterranean formation for normal operation. As such, the depth of the measurements obtained by the resistivity tool would be less than the depth during normal operation. The resistivity tool, nevertheless, could still operate even at a reduced capacity, i.e., in a limp mode.

Managing the power distribution can also include sharing power generated by an integrated power source with another downhole tool besides the particular tool that includes the integrated power source. The bus power controller controls the charging and the sharing according to one or more various factors generally related to the health and configuration of the downhole bus and the rechargeable batteries. For example, the bus power controller can consider a range of factors from the existing voltage of the downhole bus to power budgets of batteries, preconfigured priorities, and downhole tools.

The bus power controller can automatically manage the distribution of power or at least manage the power distribution with minimal user interaction. The bus power controller can include one or more processors to perform operations according to a series of operating instructions that correspond to one or more algorithms directed to managing the power distribution according to one or more of the various factors. The operating instructions can be located in a single device or can be distributed to multiple devices. For example, the downhole power system can include a bus master that is configured to, in addition to controlling communications on a downhole bus, perform at least some of the functions of the bus power controller. One or more of the power sources of the downhole power system may include a smart controller that can be configured to perform at least some of the functions of the bus power controller. For example, at least one smart controller is associated with each of the rechargeable batteries to monitor and manage the operations thereof.

FIG. 1 illustrates a system diagram of an example well system 100 constructed according to the principles of the disclosure. The well system 100 can be, for example, a logging while drilling (LWD) system or a measuring while drilling (MWD) system. Well system 100 includes a borehole 102 that extends into a subterranean formation 104 from surface 106. A derrick 110 at the surface 106 supports a drill string 120 that is within the borehole 102. Attached to the end of the drill string 120 is BHA 130 that includes a drill bit 132. When drilling, the drill bit 132 is rotated to extend the borehole 102 into the subterranean formation 104. The drill bit 132 may be driven by a downhole motor and/or rotation of the drill string 120 from the surface 106.

A pump (or pumps) 140 circulates drilling mud through the drill string 120 during drilling of the borehole 102. The drilling mud is circulated through a feed pipe 142, downhole through an interior of the drill string 120, through orifices in the drill bit 132, back to the surface 106 via annulus 108, and into retention pit 144.

In addition to the drill bit 132, the BHA 130 includes various downhole tools 134 that perform various functions. Examples of the various downhole tools 134 include a formation tester, fluid sampling tools, magnetic resonance tools, resistivity tools, and other logging tools. Each of the various downhole tools 134 are typically located within separate pressurized housings, such as represented by downhole tool 135, that are connected to each other.

Figure 2:
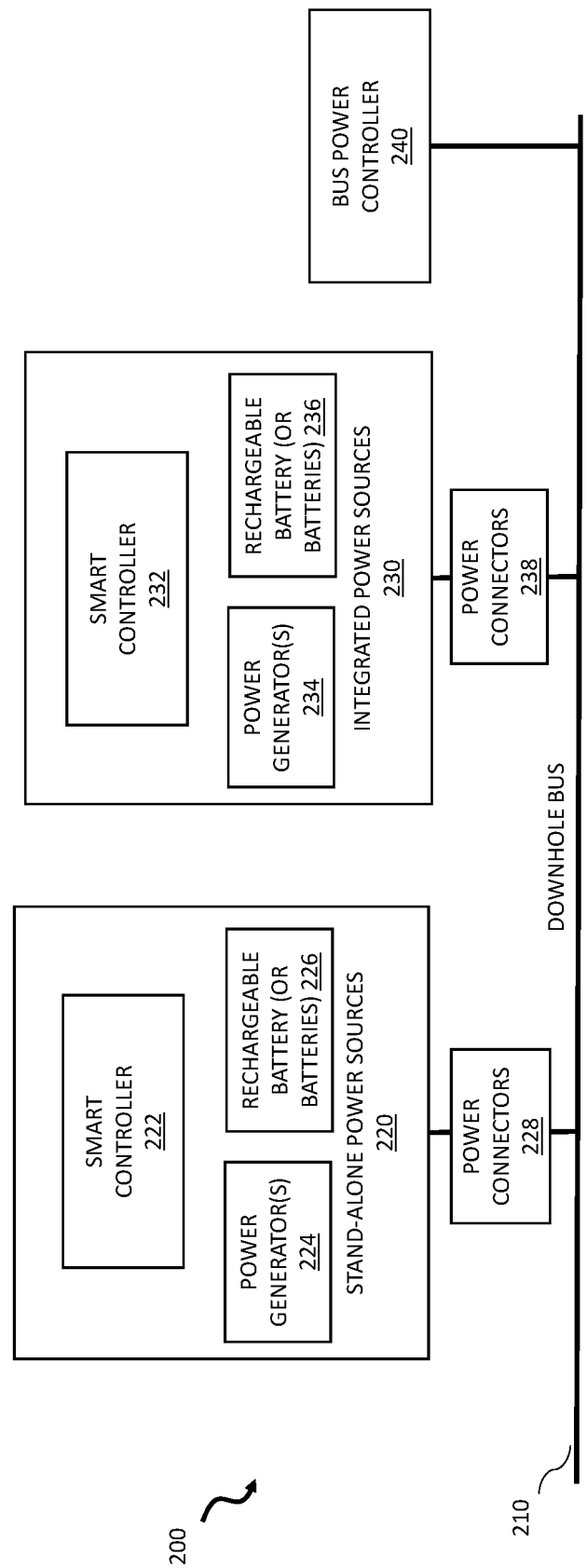
FIG. 2 illustrates a block diagram of an example of a downhole power system constructed according to the principles of the disclosure.
Figure 3:
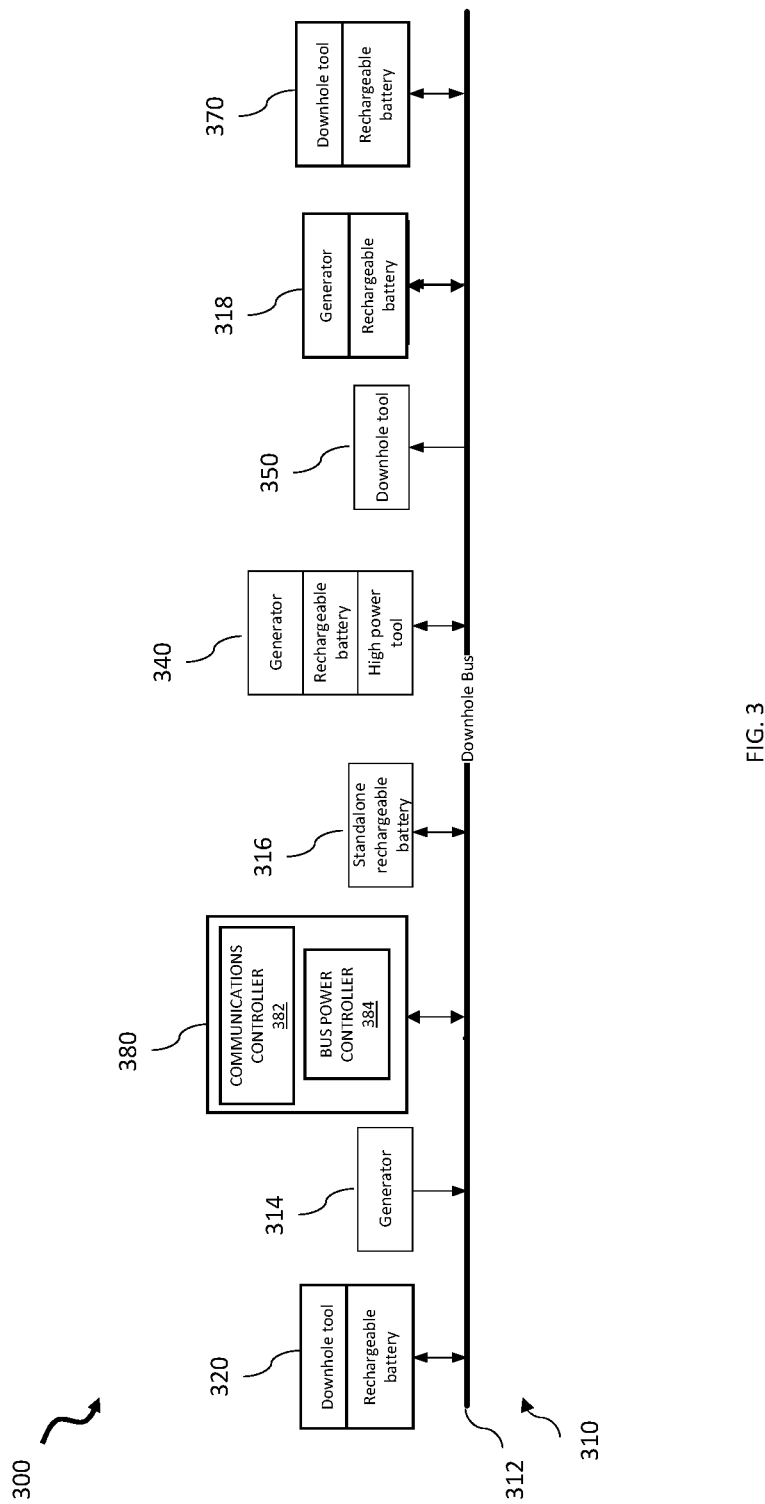
FIG. 3 illustrates a system diagram of an example bottom hole assembly (BHA) configured according to the principles of the current disclosure.
Figure 4:
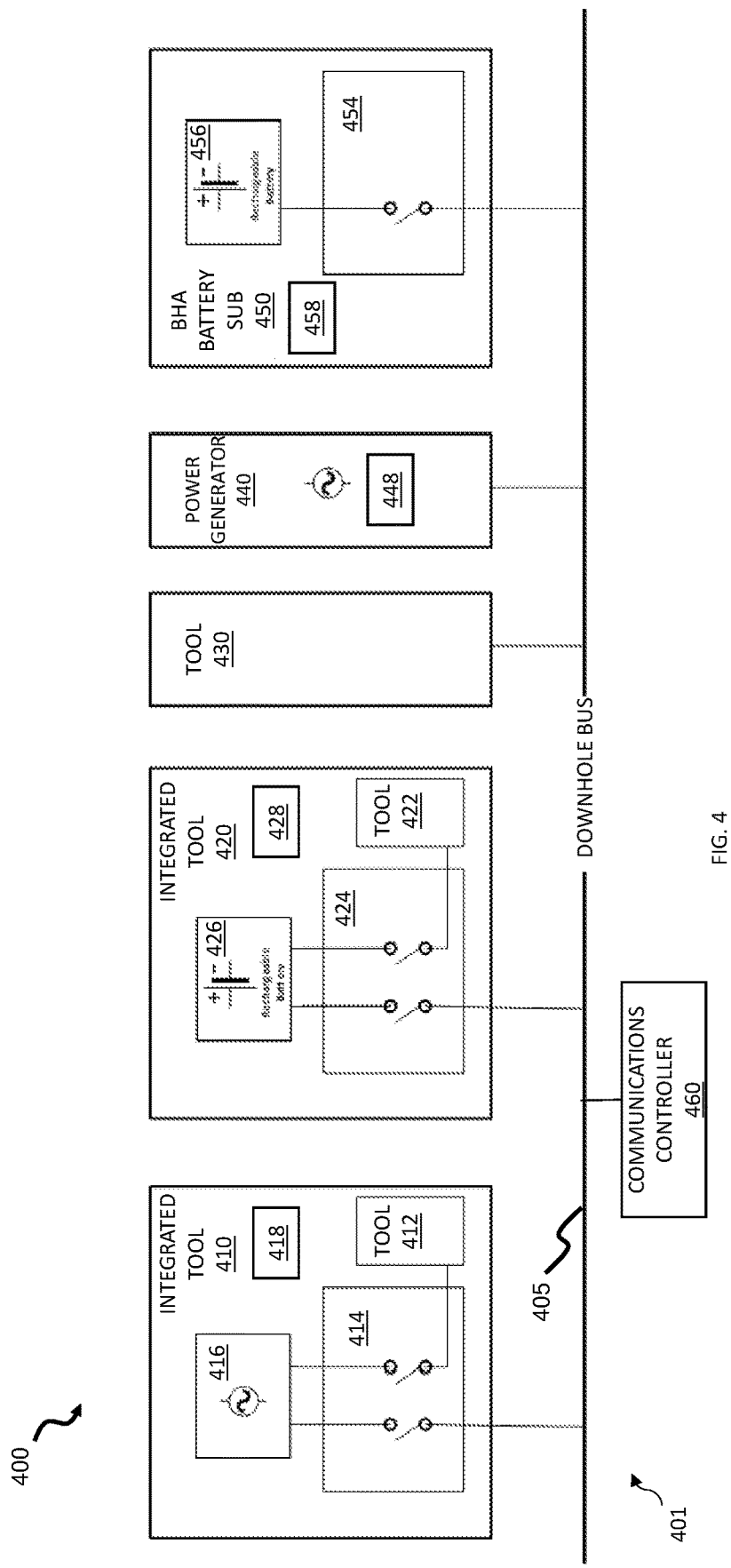
FIG. 4 illustrates a block diagram of another example of a BHA having a downhole power system configured according to the principles of the current disclosure.

The BHA 130 also includes a downhole power system 136 that provides power for operating the downhole tools 134. The downhole power system 136 includes a bus power controller (not shown in FIG. 1), one or more power sources, represented by power source 138, and a downhole bus 139. The downhole power system 136 can be a smart system that is configured to automatically manage the distribution of power; including the sharing of power. The downhole power system 136 can also be a distributed system wherein the power sources are strategically positioned along the downhole bus 139. The one or more power sources can be a stand-alone power source or an integrated power source. The downhole bus 139 runs through each of the separate housings of the downhole tools 134 and the stand-alone power sources and distributes power to or from the one or more power sources and downhole tools 134 that are connected to it. The downhole bus 139 also provides a communication medium between the connected downhole tools 134 and the power sources. The one or more power sources can be batteries, such as rechargeable batteries, downhole power generators, or a combination thereof. The rechargeable batteries can be charged in the borehole 102 using one or more of the downhole power generators. Additionally, one or more of the rechargeable batteries can be charged at the surface 106, such as through a sidewall port or the downhole bus 139. The rechargeable batteries could then be charged downhole after the initial charging at the surface 106. One or more non-rechargeable batteries may also be used but the downhole power system 136 may not include a non-rechargeable battery. FIGS. 2-4 provide examples of downhole power systems, such as downhole power system 136, and downhole tools that are connected thereto.

Drilling system 100 also includes a well site controller 160 and a computing system 165. Well site controller 160 includes a processor and a memory and is configured to direct operations of drilling system 100. Well site controller 160 can be communicatively coupled with the computing system 165 for assistance in operation of the drilling system 165. Well site controller 160 or computing system 165 can be utilized to communicate with the BHA 130, such as sending and receiving acoustic data, telemetry, instructions, subterranean formation measurements, and other information. Computing system 165 can be proximate well site controller 160 or be a distance away, such as in a cloud environment, a data center, a lab, or a corporate office. Computing system 165 can be a laptop, smartphone, server, desktop computer, cloud computing system, other computing systems, or a combination thereof. Well site operators, engineers, and other personnel, collectively referred to as users, can send and receive data, instructions, measurements, and other information by various conventional means, now known or later developed, with computing system 165 or well site controller 160. Well site controller 160 or computing system 165 can communicate using conventional means, now known or later developed, to direct operations of downhole BHA 130.

As mentioned above, the downhole power system 136 can be a "smart" power management system that does not require power management decisions from a user located, for example, at the surface 106. As such, the downhole power system 136 can automatically make power management decisions. The downhole power system 136 can report power system data about the downhole power system to one or more of the users. The power system data includes, for example, status and diagnostic information about the downhole power system. The data can be sent in real time using various conventional means, such as mud pulse or any telemetry service used for a particular downhole operation. As such, the downhole power system 136 can be a smart system that notifies one or more users by sending power system data, such as critical status and diagnostic messages. A communications controller associated with the downhole bus 139 can direct communications to the surface from the downhole power system.

FIG. 2 illustrates a block diagram of an example of a downhole power system 200 constructed according to the principles of the disclosure. The downhole power system 200 includes a downhole bus 210, one or more stand-alone power sources 220, one or more integrated power sources 230, and a bus power controller 240. The stand-alone power sources 220 and the integrated power sources 230 both include a smart controller 222, 232, and at least one power source represented by power generators 224 and rechargeable batteries 226 for the stand-alone power sources 220 and power generators 234 and rechargeable batteries 236 for the stand-alone power sources 230.

The downhole bus 210 is communicatively and electrically connected to the stand-alone power sources 220, the integrated power sources 230, and the bus power controller 240. The downhole bus 210 can be a conventional bus that is used in a BHA, such as downhole bus 139 of FIG. 1. The downhole bus 210 is also communicatively connected to equipment at the surface. For example, the downhole bus 210 can be communicatively coupled to a well controller, such as well controller 160 of FIG. 1.

Regarding communications, the downhole bus 210 can be used for communicating power system data between the stand-alone power sources 220, the integrated power sources 230, and the bus power controller 240. The power system data includes operating parameters from real-time measurements of the connected components, which includes the stand-alone and integrated power sources 220, 230, and the downhole tools connected to the downhole power bus 210. The operating parameters include internal resistance, charge efficiency, temperature, and voltage level of the rechargeable batteries 226, 236. The operating parameters also include voltage, current, and power levels of the downhole bus 210, and an operating status of the downhole power generators 224, 234, which can be represented by an indication of drilling mud flowing in the borehole depending on the type of power generator. A pressure change in the borehole, an indication of pumps operating, such as pumps 140 in FIG. 1, a voltage level of the downhole bus 210, or a combination therein can be used to indicate the flow or no flow of drilling mud in the borehole.

The power system data can also include configuration parameters of the connected components. Whereas the operating parameters are dynamic, the configuration parameters are static. The configuration parameters include battery type, optimal operating conditions, charging and discharging limitations (maximum amount of current that can be drawn at various battery temperatures), and the expected charging and discharging thresholds (expected time and energy). The configuration parameters of the downhole bus 210 include current draw limits, power draw limits, and minimum and maximum voltage levels. The smart controllers 222, 232, and/or the bus power controller 240 can monitor, report, and act upon at least some of the power system data.

A portion of the power system data can be sent to the bus power controller 240 in response to broadcast messages sent from the bus power controller 240 to components connected to downhole power bus 210. The power system data can also be sent to the bus power controller 240 in response to queries sent from the bus power controller 240 to a specific component, such as smart controller 222. Instead of a response to a broadcast message or query, one or more of the connected components can automatically send power system data to the bus power controller 240. The smart controllers 222, 232, can communicate the power system data associated with the rechargeable batteries 226, 236, to the bus power controller 240. The configuration parameters may be loaded into a memory associated with the smart controllers 222, 232, and/or associated with the bus power controller 240 before being deployed within a borehole.

The bus power controller 240 can send power system data to the surface during an operation, such as drilling. For example, the bus power controller 240 can send critical status and diagnostic messages to a user in real time. The bus power controller 240 can cooperate with a communications controller, such as communications controller 380 or 460 of FIG. 3 or 4, to send power system data to the surface via various conventional means.

Regarding the electrical connectivity, the downhole bus 210 can be used for distributing power between the stand-alone power sources 220, the integrated power sources 230, and the downhole tools connected to the downhole bus 210. The bus power controller 240 can manage the power distribution based on various factors that can be based, for example, on at least some of the power system data.

As noted above, the stand-alone power sources 220 include at least one downhole power generator and at least one rechargeable battery, represented by downhole power generator 224 and rechargeable battery 226. The downhole power generator 224 and the rechargeable battery 226 are each connected to the downhole bus 210 via a power connector represented by power connectors 228 in FIG. 2. The power connectors 228 can include a bidirectional connection that allows providing power from the stand-alone power sources 220 to the downhole bus 210 and receiving power from the downhole bus 210 for charging the rechargeable batteries 226. The power connectors 228 can include switches that are controlled by, for example, the smart controller 222 or the bus power controller 240. The power connectors 228 can be a static connection, such as a diode connection, that allows the consumers of power or loads, such as downhole tools (not shown) connected to the downhole bus 210, to pull power from the power generator 224 first and then the rechargeable battery 226 when the voltage produced by the downhole power generator 224 is maintained at a higher setting than the battery voltage from the rechargeable battery 226.

The integrated power sources 230 also includes at least one power generator 234 and at least one rechargeable battery 236. Each of the integrated power sources 230 are included with a downhole tool and designed to provide power for that particular tool, referred to herein as the primary tool, as a first priority. More than one of the integrated power sources 230 can be included in a single downhole tool. For example, a power generator 234 and a rechargeable battery 236 can be integrated with a single downhole tool. The integrated power sources 230 are each connected to the downhole bus 210 via a power connector represented by power connectors 238 in FIG. 2. The power connectors 238 can include a bidirectional connection that allows providing power from the stand-alone power sources 230 to the downhole bus 210 and receiving power from the downhole bus 210 for charging the rechargeable batteries 236. The power connectors 238 can include switches that are controlled by, for example, the smart controller 232 or the bus power controller 240. The power connectors 238 can include a diode connection such as noted above with respect to power connectors 228. Since the first priority of the integrated power sources 230 is to provide power for their primary tool, the integrated power sources 230 provide power at a voltage level for their particular tool, which can be different than the voltage of the downhole bus 210. The voltage level for each particular tool can vary. For example, the operating voltages of different downhole tools can be considered low, medium, or high. As such, the power connectors 238 may also include power converters for providing the proper voltage between the downhole bus 210 and the integrated power sources 230.

The downhole power system 200 can be a distributed power system that considers the location of downhole tools and power sources connected to the downhole bus 210. One or more of the stand-alone power sources 220 can be positioned proximate a downhole tool that may typically require more power for operating than other downhole tools connected to the downhole bus 210. As such, the stand-alone power sources 220 can be distributed along the downhole bus 210 to, for example, reduce voltage drop across the downhole bus 210. The positioning of the integrated power sources 230 with respect to other downhole tools and stand-alone power sources 220 can also be considered when configuring the downhole power system 200. Accordingly, the tools and power sources of a BHA, such as BHA 130 of FIG. 1, can be arranged to optimize the distribution of power.

The bus power controller 240 is configured to manage distribution of power across the downhole bus 210. The bus power controller 240 can be a separate device connected to the downhole bus 210 or can be integrated with one of the stand-alone power sources 220, integrated power sources 230, or downhole tools associated with the integrated power sources 230. The logic of the bus power controller 240 can be distributed to different processors. For example, a portion of the logic for managing the distribution of power can be in a bus master connected to the downhole bus 210 if present and a portion of the logic can be in one or more of smart controllers 222, 232.

One aspect of the bus power controller 240 managing the power distribution includes charging the rechargeable batteries 226 and 236. One or more of the downhole power generators 224, 234, can be used for charging one or more of the rechargeable batteries 226, 236. Another aspect of the bus power controller 240 managing the power distribution includes sharing power from one of the integrated power sources 230 with another downhole tool besides the primary tool. The bus power controller 240 can consider various factors for directing the charging and the sharing via the downhole power system 200. For example, the bus power controller 240 can control the charging and sharing according to one or more various factors generally related to the health and configuration of the downhole bus 210 and connected components, such as the rechargeable batteries 226, 236. The bus power controller 240 can use operating parameters and configuration parameters for managing the power distribution.

FIG. 3 illustrates a system diagram of an example BHA 300 having a downhole power system 310 constructed according to the principles of the disclosure. The downhole power system 310 includes a downhole bus 312 and multiple stand-alone and integrated power sources connected to the downhole bus 312. The stand-alone power sources include generator 314, rechargeable battery 316, and combination power source 318. The integrated power sources are shown with downhole tools of the BHA 300. Each of the integrated and stand-alone power sources can be connected to the downhole bus 312 via a power connector, such as either power connector 228 or 238. The arrows connecting the various power sources indicate if the power source only provides power to the downhole bus 312 (i.e., unidirectional) or can provide power and also receive power for recharging, (i.e., bidirectional). In FIG. 2, the power connectors 228, 238, are shown external to the stand-alone and integrated power sources 228, 238. The power connectors 228, 238, can be included within their particular BHA power subs as represented by switches 414, 424, and 454 in FIG. 4.

The BHA 300 includes downhole tools 320, 340, 350, and 370. Downhole tools 320, 340, and 370 include at least one integrated power source. Downhole tools 320 and 370 include integrated rechargeable batteries. Downhole tool 340 is a high power tool that includes both a power generator and a rechargeable battery. Since the downhole tools 320, 340, and 370 include a rechargeable battery, the downhole tools 320, 340, and 370 can provide power to and receive power from downhole bus 312. Similarly, the rechargeable battery 316 and the combination power source 318 can also provide power to and receive power from the downhole bus 312.

The BHA 300 also includes a bus master 380 having a communications controller 382 and a bus power controller 384. The communications controller 382 is communicatively connected to the power sources of the downhole power system 310 and the downhole tools of the BHA 300 via the downhole bus 312. The communications controller 310 can also communicate with the surface, such as with a well site controller 160, via the downhole bus 312. The communications controller 382 can direct communications via the downhole bus 312 using various types of communication systems or protocols used in the industry. The communications controller 382, for example, can send out queries or broadcast messages to transmit or receive data over the downhole bus 312. The data can be power system data received from, for example, smart controllers (not shown in FIG. 3) associated with the rechargeable batteries or associated with other power sources of the downhole power system 310.

The bus master 380 also has a bus power controller 384 that manages power distribution using the downhole bus 312, such as bus power controller 240 of FIG. 2. The bus power controller 384 can control charging of the rechargeable batteries of the integrated and stand-alone power sources and sharing of power from the integrated power sources to another tool besides the primary tool based on various factors associated with the power system data. The bus power controller 384 can manage power distribution, such as the sharing and charging, according to the method of FIG. 6.

FIG. 4 illustrates a block diagram of another example of a BHA 400 having a downhole power system 401 configured according to the principles of the current disclosure. The BHA 400 includes a plurality of downhole tools, such as a downhole tool integrated with a power generator (integrated tool 410), a downhole tool integrated with a rechargeable battery (integrated tool 420), and a downhole tool (tool 430) that receives power via downhole bus 405 of the downhole power system 401. In addition to the integrated power sources, the downhole power system 401 also includes a plurality of power sources dedicated to provide power to the downhole bus 405. The dedicated power sources, referred to as stand-alone power sources, include power generator 440 and battery sub 450. The tools 410, 420, 430, and power sources 440, 450 are communicatively coupled to one another via the downhole bus 405.

The downhole bus 405 can be a single wire that is configured to deliver both power and communications for the BHA 400. All of the tools and power sources within the BHA 400 are connected to the downhole bus 405 so that they can receive and/or provide power and communications from/to the downhole bus 405. While the downhole bus 405 can be a single wire bus, it is not limited to such a configuration. For example, the downhole bus 405 can include multiple wires or conductors wherein at least one is dedicated for power and at least one is dedicated for communications.

The BHA 400 also includes a communications controller 460 that directs communications via the downhole bus 405. The communications controller 460 can be configured to operate as the communications controller 382 of the bus master 380. As such, the communications controller 460 can manage communications according to various different communication systems or protocols.

In BHA 400, the bus power control functionality of the bus master 380 can be included within smart controllers associated with an integrated or stand-alone power source of the downhole power system 401. Smart controllers 418, 428, 448, and 458 are illustrated in FIG. 4. The functionality of the communications controller 460 can also reside within one or more of the smart controllers 418, 428, 448, and 458. Each of the smart controllers 418, 428, 448, and 458 can be a standard processing block or processor configured with the same or similar functionality that can be selectively activated for specific installations. For example, smart controllers 428 and 458 can be configured to monitor rechargeable batteries and smart controllers 418 and 448 can be configured to monitor power generators. As such, a standard smart controller can be used and adjusted when necessary by activating certain features.

The integrated tool 410 represents a type of a tool having an integrated power generator 416. The integrated tool 410 includes, in addition to the integrated power generator 416, the tool itself 412, switches 414, and smart controller 418 that are communicatively connected to one another using conventional means. The smart controller 418, and also the other smart controllers 428, 448, and 458, are also communicatively connected to the downhole bus 405 via, for example, conventional means.

The tool 412 is a downhole tool, such as a sensor, that is configured to perform its intended function using power from the power generator 416 and/or the downhole bus 405. The integrated power generator 416 is a downhole generator such as a turbine that generates power using a flow of mud from a pump. The smart controller 418 is configured to perform various operations, such as monitoring and managing operating conditions of the integrated power generator 416 and routing power generated by the integrated power generator 416 and/or available in the downhole bus 405 to other tools or rechargeable batteries connected to the downhole bus 405. As such, the smart controller 418 can control the switches 414 to, for example, provide power from the power generator 416 to only the tool 412, provide power from the power generator 416 to the downhole bus 405 (such as when tool 412 is not operating), provide power from the power generator 416 to both the tool 412 and the downhole bus 405, or provide power from the downhole bus 405 to the tool 412.

The integrated tool 420 represents a type of a tool that is integrated with a rechargeable battery 426. The integrated tool 420 includes, in addition to the integrated rechargeable battery 426, the tool itself 422, switches 424, and smart controller 428 that are connected to one another using conventional means. The tool 422 is configured to perform its intended function using power from the rechargeable battery 426 and/or the downhole bus 405. The rechargeable battery 426 may be a conventional rechargeable battery that can be charged using power generated by a generator of the downhole power system 400 and discharge as directed by the smart controller 424. For example, the rechargeable battery 426 can store energy when the downhole bus 405 is being energized by power generators 416 or 440 and provide its stored energy to tool 422 and/or the downhole bus 405.

The smart controller 428 performs various operations that include, for example, monitoring and managing operating conditions of the rechargeable battery 426, routing power from the rechargeable battery 426 and/or power available on the downhole bus 405 to other tools or rechargeable batteries connected to the downhole bus 405, and performing diagnostics on the rechargeable battery 426.

The tool 430 represents a downhole tool that does not have an integrated power source but is connected to the downhole bus 405 and configured to perform its intended function using power available on the downhole bus 405, which may be from one or more power sources of the downhole power system 400.

The stand-alone power generator 440 represents a type of power source that is dedicated to provide power to the downhole bus 405. The power generator 440 can generate power using a flow of mud from a pump. Unlike an integrated power generator, such as power generator 416 that is connected to its tool 412 and smart controller 418, the power generator 440 is connected to the downhole bus 405.

The BHA battery sub 450 represents another power source for the BHA 400 that is connected to the downhole bus 405. The BHA battery sub 450 includes a switch 454, a rechargeable battery 456, and smart controller 458 that is connected to the switch 454 and the rechargeable battery 458 using conventional means. The rechargeable battery 454 may be a conventional rechargeable battery that is configured to charge and discharge as directed by smart controller 458. For example, the rechargeable battery 454 can store energy and provide energy as described above with respect to rechargeable battery 426.

The smart controller 458 performs various operations that include, for example, monitoring and managing operating conditions of the rechargeable battery 456, routing power from the rechargeable battery 456 to one or more tools of the BHA 400 or rechargeable battery 426 via the downhole bus 405, and performing diagnostics on rechargeable battery 456.

It is understood that in FIG. 4, each type of the tools and power sources included within the BHA 400 is only illustrated once for brevity. As such, the number and locations are not limited as shown and may differ. It is also understood that, although not shown, the BHA 400 may include other conventional components of a BHA.

Figure 5:
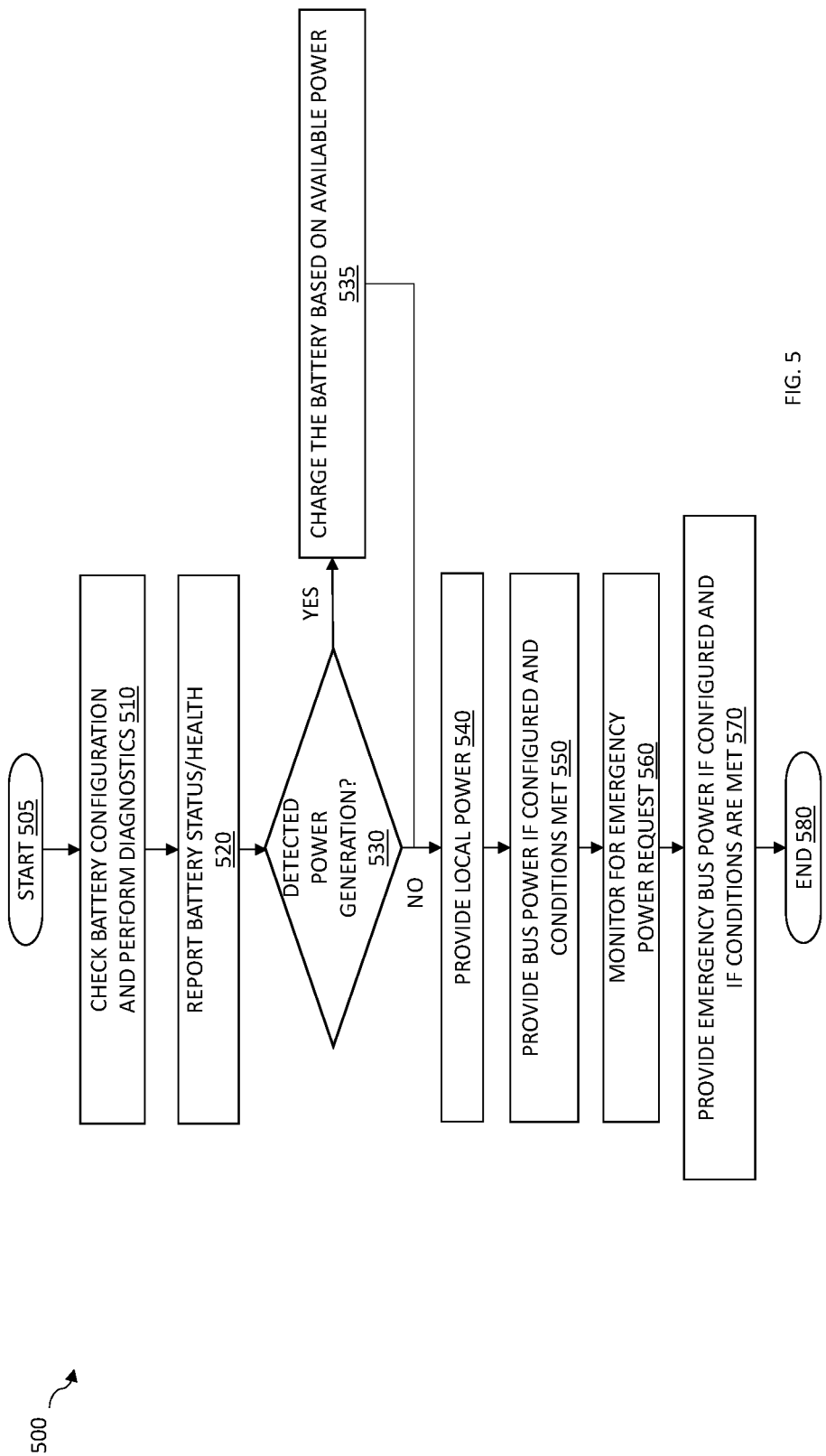
FIG. 5 illustrates a flow diagram of an example method of managing power distribution in a downhole power system carried out according to the principles of the disclosure.

FIG. 5 illustrates a flow diagram of an example method 500 of managing power distribution in a downhole power system carried out according to the principles of the disclosure. The method 500 specifically relates to an example of operations performed by a smart controller associated with a rechargeable battery of a downhole power system. The smart controller can include one or more processors to perform operations according to a series of operating instructions that correspond to one or more algorithms directed to managing and monitoring the rechargeable battery and the power distribution. Example smart controllers include smart controller 428 of FIG. 4 or a smart controller of integrated downhole tools 320 and 370 from FIG. 3. The method begins in step 505.

In step 510, the configuration of the rechargeable battery is checked and diagnostics are performed. The status/health of the rechargeable battery is reported in step 420. The status/health can be reported in response to a query or message. The status/health can also be reported according to a set time or in response to a detected problem with the rechargeable battery. The status and/or health of the rechargeable battery can be reported as part of power system data that is sent from a smart controller to a bus power controller via a downhole bus and a communications controller.

A determination is made in step 510 if power generation is detected. Power generation can be detected based on an operating status of the downhole power generators. Depending on the type of power generator, power generation can be detected based on indication of drilling mud flowing in the borehole. A pressure change in the borehole, an indication of pumps operating, or a combination therein can be used to indicate the flow or no flow of drilling mud in the borehole. A voltage level of the downhole bus can also indicate power generation in addition to other means described herein for detecting power generation by one or more downhole power generator.

If power generation is not detected, the method 500 continues to step 540 wherein power is provided to the integrated tool associated with the rechargeable battery. For example, smart controller 428 can operate the switches 424 to provide power from the rechargeable battery 426 to the tool 422. The tool 422 can then operate using power provided by the rechargeable battery 426.

The rechargeable battery provides power to the downhole bus in step 550 if configured to provide power and if conditions are met. The rechargeable battery can be configured to provide power to the bus via an electrical connection to the bus. For example, smart controller 428 can operate the switches 424 to connect the rechargeable battery 426 to the downhole bus 405 is disconnect the rechargeable battery 426 from the primary tool 422.

In step 560, emergency requests are monitored. The smart controller can listen for emergency requests for power sent via the downhole bus. The emergency request can be sent via a bus power controller or from another smart controller. For example, smart controller 418 may determine that power generator 416 is disabled or partially disabled and cannot provide sufficient power to operate primary tool 412. Accordingly, smart controller 418 can send a request for emergency power that smart controller 428 receives.

In step 570, power is provided from the rechargeable battery to the downhole bus in response to an emergency request when configured to provide emergency power and if conditions are met. The smart controller associated with the rechargeable battery will determine if there is available power to respond to the emergency request based on various factors, such as the operating parameters and the configuration parameters of the rechargeable battery. Thresholds can be established to determine if there is available power to respond to the emergency request. The method 500 continues to step 580 and ends.

Returning to step 530, if power generation is detected, the rechargeable battery is charged in step 535 based on the available power. The available power can be determined based on power system data, or a portion thereof, that includes operating parameters and configuration parameters of the downhole bus and rechargeable battery. The method 500 then continues to step 540. Though the method 500 has a start and end in FIG. 5, the method 500 can be repeated multiple times, for example continuously, during a downhole operation of a BHA.

Figure 6:
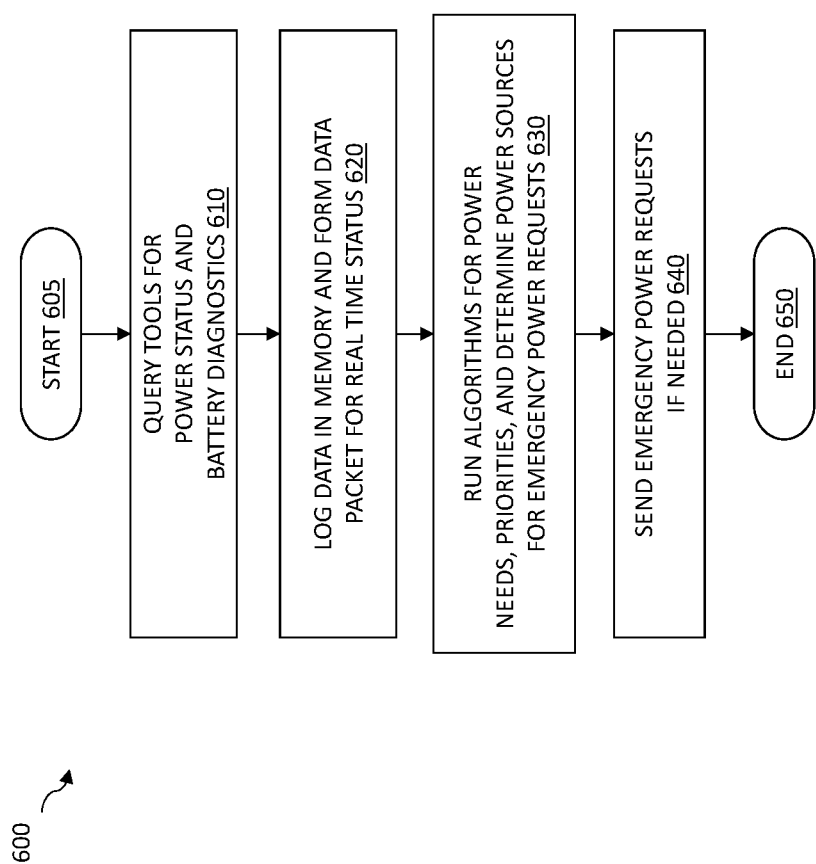
FIG. 6 illustrates a flow diagram of another example method of managing power distribution in a downhole power system carried out according to the principles of the disclosure.

FIG. 6 illustrates a flow diagram of an example method 600 of managing power distribution in a downhole power system carried out according to the principles of the disclosure. The method 600 specifically relates to an example of operations performed by a bus power controller of a downhole power system, such as bus power controller 240 of FIG. 2 and 384 of FIG. 3. The bus power controller can include one or more processors to perform operations according to a series of operating instructions that correspond to one or more algorithms directed to managing and monitoring power distribution of a downhole power system. The method begins in step 605.

In step 610, tools are queried for power status and battery diagnostics. The bus power controller can send out queries or messages to the various power sources or smart controllers associated therewith to determine the operating parameters. For example, bus power controller 384 can broadcast a message via communications controller 382 and the downhole bus 312 to the various power sources or associated smart controllers of downhole power system 310. The responses can be sent as power system data to the bus power controller.

The data is logged and recorded in a memory in step 620 and a data packet is formed representing real time status. The bus power controller can receive the power system data from the various power sources via the downhole bus and communications controller and save the data in an associated memory. The bus power controller can form a data packet that includes the real time status of all the power sources. For example, bus power controller 384 can receive, in response to the broadcast message, power system data from the various power sources of downhole power system 310 via the communications controller 382 and the downhole bus 312.

Algorithms are run in step 630 for power needs, priorities, and for determining power sources for emergency power requests. The bus power controller analyzes factors, such as the real time status of the power sources and the power requirements of tools connected to the downhole bus, and determines if any emergency power is needed for a tool. The bus power controller can also incorporate knowledge regarding when certain tools may operate to determine if an emergency requests is needed. Machine learning may be used to analyze the operation of the downhole power system and discover possible trends for improving management of the downhole power system.

In step 640, emergency power requests are sent if needed. The bus power controller can send the emergency power requests based on the analysis of step 630. Continuing the example using FIG. 3, the bus power controller 384 can determine that the rechargeable battery of integrated downhole tool 320 will not be able to provide sufficient power for the primary tool to operate. Accordingly, the bus power controller 384 can determine what power source or sources of the downhole power system 310 have available power that can be used for emergency power and send an emergency power request to one or more of the power sources.

The method 600 continues to step 650 and ends. As noted with method 500, the method 600 can be repeated multiple times, for example continuously, during a downhole operation of a BHA.

Figure 7:
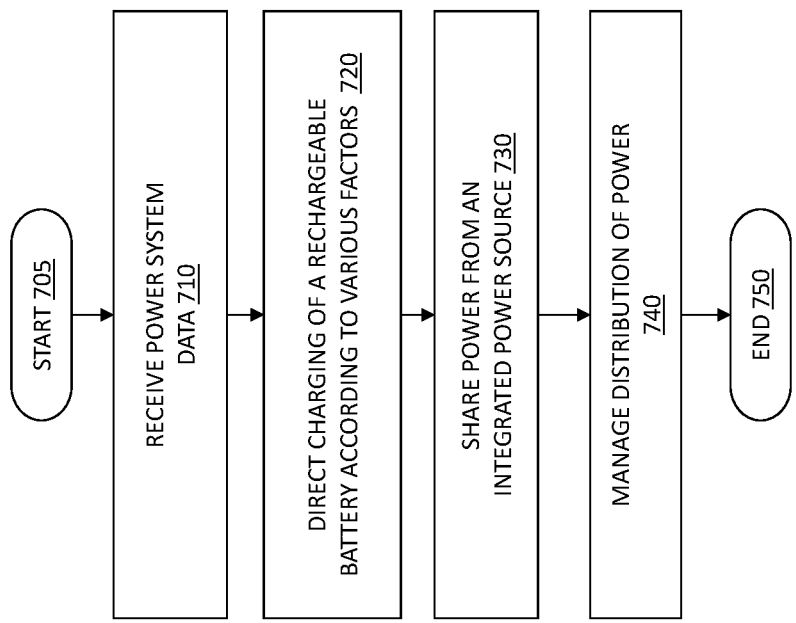
FIG. 7 illustrates a flow diagram of yet another example method of managing power distribution in a downhole power system carried out according to the principles of the disclosure.

FIG. 7 illustrates a flow diagram of an example method 700 of managing power distribution in a downhole power system carried out according to the principles of the disclosure. A controller, such as a bus power controller or a smart controller, of the downhole power system can perform the steps. For the following discussion of method 700, a bus power controller, such as bus power controller 240 of FIG. 2 and 384 of FIG. 3, will be used as an example controller. The bus power controller can include one or more processors to perform operations according to a series of operating instructions that correspond to one or more algorithms directed to managing the power distribution. The downhole power system includes at least one integrated power source and at least one stand-alone power source, which includes at least one downhole power generator and at least one rechargeable battery. The downhole power system can be included within a BHA having downhole tools that are powered by the downhole power system. The method begins in step 705 by providing power to the downhole tools via the downhole power system.

In step 710, power system data is received by the bus power controller of the downhole power system. Power system data at least includes operating parameters related to one or more of the power sources and downhole tools. The power system data can also include configuration parameters of the power sources and downhole tools.

In step 720, the bus power controller directs charging of one or more of the rechargeable batteries. The bus power controller can determine to charge a rechargeable battery based on various factors associated with the power system data. For example, the bus power controller can consider if the rechargeable battery needs charging and if there is an available power source that can provide power for the charging. Determining an available power source can be based on if a power generator is producing power. Various factors can be considered for determining if charging is needed, such as available energy from the rechargeable battery and an estimate of energy that will be needed for an integrated load or load of another downhole tool. The charging can be a slow charge or high powered, rapid charge. The various factors may indicate that charging is not needed or possible and method 700 continues to step 730.

The bus power controller determines to share power from one of the integrated power sources in step 430. The bus power controller determines to share power based on several factors including the energy needed for a load of the integrated tool and available energy from the integrated power source. In other words, the bus power controller insures the primary downhole tool will have sufficient power before sharing power from an integrated power source with another downhole tool. Sharing of in integrated power source can be conditional and based on emergency needs of, for example, a downhole tool. The various factors considered by the bus power controller may indicate that sharing is not needed or possible and method 700 continues to step 740.

In step 740, the power controller continues to manage routing power via the downhole bus to the various downhole tools. The method 700 can continue during operation of the BHA while in the borehole. Accordingly, the method 700 can continue to consider recharging and sharing power as noted in steps 720 and 730 while managing power distribution. The method continues to step 750 and ends.

Figure 8:
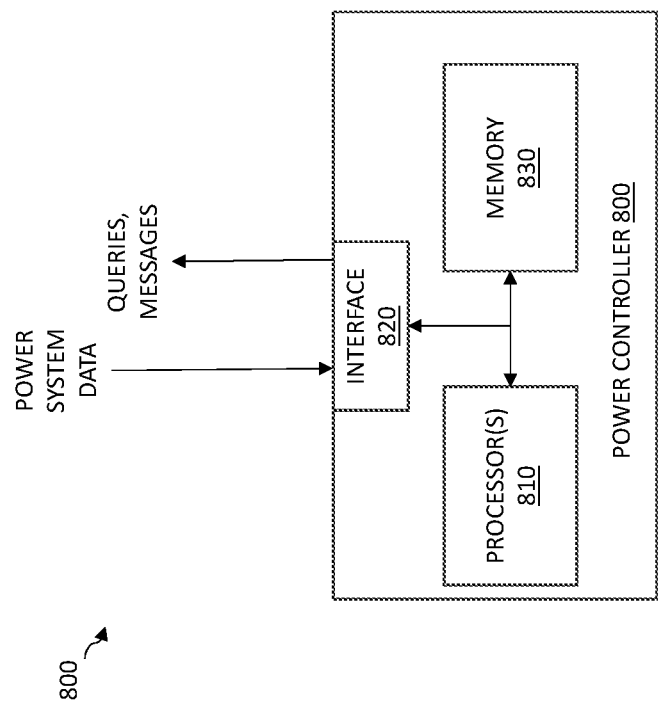
FIG. 8 illustrates a block diagram of an example of a power controller for directing well operations according to the principles of the disclosure.

FIG. 8 illustrates a block diagram of an example of a power controller 800 for directing well operations according to the principles of the disclosure. The power controller 800 is configured to manage the distribution of power from different downhole power sources connected to a downhole bus to downhole tools connected to the downhole bus. The power controller 800 can automatically manage the distribution of power or at least manage the power distribution with minimal user interaction. The power controller 800 can be a distributed system wherein the functional logic is distributed across multiple computing devices, such as one or more of the different smart controllers, bus masters, and bus power controllers as disclosed herein.

The power controller 800 includes one or more processors, represented by processor 810, an interface 820, and a memory 830 that are communicatively connected to one another using conventional means. The processor 810 performs operations according to a series of operating instructions that correspond to one or more algorithms directed to managing the power distribution according to one or more of the various factors. The operating instructions can be located in a single device or can be distributed to multiple devices and can correspond to at least some of the steps of the methods disclosed in FIGS. 5, 6, and 7. The one or more algorithms can be encapsulated in software code or in hardware, for example, an application, code library, dynamic link library, module, function, RAM, ROM, and other software and hardware implementations. The software can be stored in a file, database, or other computing system storage mechanism. The one or more algorithms can be represented as a series of operating instructions stored on the memory 820.

The interface 820 receives and transmits data, such a power system data, queries, and messages. The interface 820 can communicate the data via a downhole bus or other communication means, such as another wired or wireless communications mean. The interface 820 may cooperate with a communications controller as disclosed herein to communicate data. The interface 820 communicates the power system data to the processor 810 or the memory 830. The interface 820 may be implemented using conventional circuitry and/or logic.

The memory 830 can be a non-transitory memory that stores data, e.g., sensor measurements from a wellbore and seismic data, which is needed in determining the rock properties. The memory 830 also store a series of instructions that when executed, causes the processor 810 to perform the disclosed methodology. The memory 830 may be a conventional memory device such as flash memory, ROM, PROM, EPROM, EEPROM, DRAM, SRAM and etc.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Configured or configured to means, for example, designed, constructed, or programmed, with the necessary logic and/or features for performing a task or tasks.

Those skilled in the art to which this application relates will appreciate that other and further additions, deletions, substitutions and modifications may be made to the described embodiments. Unless defined otherwise, all technical and scientific terms used herein have the same meaning as commonly understood by one of ordinary skill in the art to which this disclosure belongs.

Aspects disclosed herein include:

A. A downhole distributed power system, comprising: (1) a downhole bus, (2) different power sources connected to and strategically positioned on the downhole bus, and (3) one or more controllers to perform operations that includes managing distribution of power, from the different power sources, to downhole tools connected to the downhole bus, wherein the different power sources include one or more power generators and one or more rechargeable batteries that are chargeable downhole B. A power controller of a downhole power system, comprising: (1) an interface to receive power system data from downhole tools and from different power sources of the downhole power system, and (2) one or more processors to perform operations that includes managing distribution of power from the different power sources to the downhole tools based on the power system data, wherein the different power sources include one or more power generators and one or more rechargeable batteries that are chargeable downhole, wherein the managing includes charging the one or more rechargeable batteries using the one or more power generators C. A bottom hole assembly (BHA) comprising (1) downhole tools and (2) a downhole distributed power system, including: (2A) a downhole bus, (2B) different power sources connected to and strategically positioned on the downhole bus, and (2C) one or more controllers to perform operations including: managing distribution of power, from the different power sources, to the downhole tools connected to the downhole bus, wherein the different power sources include one or more power generators and one or more rechargeable batteries that are chargeable downhole.

Each of the aspects A, B, and C can have one or more of the following additional elements in combination. Element 1: wherein managing the distribution of power includes charging the one or more rechargeable batteries using the one or more power generators. Element 2: wherein the charging includes detecting power generation by the one or more power generators. Element 3: wherein the detecting is based on one or more factors including a voltage of the downhole bus, drilling fluid flow in the borehole, pressure change in the borehole, a broadcast message, and a query. Element 4: wherein the detecting is based on at least two of the factors. Element 5: wherein the charging is based on operating parameters of both the downhole bus and the one or more rechargeable batteries. Element 6: wherein the operating parameters of the one or more rechargeable batteries include one or more of internal resistance, charge efficiency, temperature, and voltage. Element 7: wherein the operating parameters of the downhole bus include one or more of bus voltage, current draw limits, or power draw limits. Element 8: wherein the charging is a trickle charge or a high-powered charge. Element 9: wherein the different power sources include at least one integrated power source integrated with one of the downhole tools and managing the distribution of power further includes sharing power from the at least one integrated power source with another one of the downhole tools. Element 10: wherein the sharing is based on monitoring energy needed for a load of the one of the downhole tools and monitoring available energy from the integrated power source. Element 11: wherein the integrated power source is one of the one or more rechargeable batteries and the sharing is further based on discharge current limitations of the battery. Element 12: wherein each of the one or more rechargeable batteries includes a smart controller and a portion of the operations are performed by the smart controller. Element 13: further comprising a bus master, wherein a portion of the operations are performed by the bus master. Element 14: wherein at least one of the different power sources is connected to the downhole bus via a power converter. Element 15: wherein managing the distribution of power includes processing and responding to emergency power requests. Element 16: wherein managing the distribution of power is performed automatically. Element 17: wherein the different power sources include at least one integrated power source integrated with one of the downhole tools and managing the distribution of power further includes sharing power from the at least one integrated power source with another one of the downhole tools. Element 18: wherein the charging includes detecting power generation by the one or more power generators based on one or more of a voltage of the downhole bus, drilling fluid flow in the borehole, pressure change in the borehole, a broadcast message, and a query. Element 19: wherein the downhole power system is a distributed power system having the different power sources strategically positioned on a downhole bus thereof.

What is claimed is:

1. A downhole distributed power system, comprising:
a downhole bus;
different power sources connected to and strategically positioned on the downhole bus; and
one or more controllers to perform operations including:
managing distribution of power, from the different power sources, to downhole tools connected to the downhole bus, wherein the different power sources include one or more power generators, one or more rechargeable batteries that are chargeable downhole, and at least one integrated power source integrated with one of the downhole tools, and managing the distribution of power includes sharing power from the at least one integrated power source with another one of the downhole tools based on monitoring energy needed for a load of the one of the downhole tools and monitoring available energy from the integrated power source.

2. The downhole distributed power system as recited in claim 1, wherein
managing the distribution of power includes charging the one or more rechargeable batteries using the one or more power generators.

3. The downhole distributed power system as recited in claim 2, wherein the charging includes detecting power generation by the one or more power generators.

4. The downhole distributed power system as recited in claim 3, wherein the detecting is based on one or more factors including a voltage of the downhole bus, drilling fluid flow in the borehole, pressure change in the borehole, a broadcast message, and a query.

5. The downhole distributed power system as recited in claim 4, wherein the detecting is based on at least two of the factors.

6. The downhole distributed power system as recited in claim 2, wherein the charging is based on operating parameters of both the downhole bus and the one or more rechargeable batteries.

7. The downhole distributed power system as recited in claim 6, wherein the operating parameters of the one or more rechargeable batteries include one or more of internal resistance, charge efficiency, temperature, or voltage.

8. The downhole distributed power system as recited in claim 6, wherein the operating parameters of the downhole bus include one or more of bus voltage, current draw limits, or power draw limits.

9. The downhole distributed power system as recited in claim 2, wherein the charging is a trickle charge or a high-powered charge.

10. The downhole distributed power system as recited in claim 1, wherein the integrated power source is one of the one or more rechargeable batteries and the sharing is further based on discharge current limitations of the battery.

11. The downhole distributed power system as recited in claim 1, wherein each of the one or more rechargeable batteries includes a smart controller and a portion of the operations are performed by the smart controller.

12. The downhole distributed power system as recited in claim 1, further comprising a bus master, wherein a portion of the operations are performed by the bus master.

13. The downhole distributed power system as recited in claim 1, wherein at least one of the different power sources is connected to the downhole bus via a power converter.

14. The downhole distributed power system as recited in claim 1, wherein managing the distribution of power includes processing and responding to emergency power requests.

15. The downhole distributed power system as recited in claim 1, wherein managing the distribution of power is performed automatically.

16. A power controller of a downhole power system, comprising:
an interface to receive power system data from downhole tools and from different power sources of the downhole power system; and
one or more processors to perform operations including:
managing distribution of power from the different power sources to the downhole tools based on the power system data, wherein the different power sources include at least one integrated power source integrated with one of the downhole tools and managing the distribution of power includes sharing power from the at least one integrated power source with another one of the downhole tools based on monitoring energy needed for a load of the one of the downhole tools and monitoring available energy from the integrated power source.

17. The power controller as recited in claim 16, wherein the different power sources further include one or more power generators and one or more rechargeable batteries that are chargeable downhole and managing the distribution of power further includes charging the one or more rechargeable batteries using the one or more power generators.

18. The power controller as recited in claim 17, wherein the charging includes detecting power generation by the one or more power generators based on one or more of a voltage of the downhole bus, drilling fluid flow in the borehole, pressure change in the borehole, a broadcast message, and a query.

19. The power controller as recited in claim 16, wherein the downhole power system is a distributed power system having the different power sources strategically positioned on a downhole bus thereof.

20. A bottom hole assembly (BHA) comprising:
downhole tools; and
a downhole distributed power system, including:
a downhole bus;
different power sources connected to and strategically positioned on the downhole bus; and
one or more controllers to perform operations including:
managing distribution of power, from the different power sources, to the downhole tools connected to the downhole bus, wherein the different power sources include at least one integrated power source integrated with one of the downhole tools, and managing the distribution of power includes sharing power from the at least one integrated power source with another one of the downhole tools based on monitoring energy needed for a load of the one of the downhole tools and monitoring available energy from the integrated power source.

21. The BHA as recited in claim 20, wherein the different power sources further include one or more power generators and one or more rechargeable batteries that are chargeable downhole.

22. The BHA as recited in claim 21, wherein the managing the distribution of power further includes charging the one or more rechargeable batteries using the one or more power generators.

* * * * *